G. S. BAKER.
BISCUIT WRAPPING MACHINE.
APPLICATION FILED OCT. 28, 1912.

1,107,474.

Patented Aug. 18, 1914.
10 SHEETS—SHEET 1.

Witnesses

Inventor
George Samuel Baker
by
Attorney

G. S. BAKER.
BISCUIT WRAPPING MACHINE.
APPLICATION FILED OCT. 28, 1912.

1,107,474.

Patented Aug. 18, 1914.
10 SHEETS—SHEET 3.

Witnesses

Inventor
George Samuel Baker
by Attorney

G. S. BAKER.
BISCUIT WRAPPING MACHINE.
APPLICATION FILED OCT. 28, 1912.

1,107,474.

Patented Aug. 18, 1914.
10 SHEETS—SHEET 6.

Witnesses.

Inventor
George Samuel Baker
by
Attorney

G. S. BAKER.
BISCUIT WRAPPING MACHINE.
APPLICATION FILED OCT. 28, 1912.

1,107,474.

Patented Aug. 18, 1914.
10 SHEETS—SHEET 7.

Witnesses

Inventor
George Samuel Baker
by Attorney

G. S. BAKER.
BISCUIT WRAPPING MACHINE.
APPLICATION FILED OCT. 28, 1912.

1,107,474.

Patented Aug. 18, 1914.
10 SHEETS—SHEET 9.

Witnesses

Inventor
George Samuel Baker
by his Attorney

G. S. BAKER.
BISCUIT WRAPPING MACHINE.
APPLICATION FILED OCT. 28, 1912.

1,107,474.

Patented Aug. 18, 1914.
10 SHEETS—SHEET 10.

Inventor
George Samuel Baker
by R. Madden
Attorney

Witnesses

UNITED STATES PATENT OFFICE.

GEORGE SAMUEL BAKER, OF LONDON, ENGLAND.

BISCUIT-WRAPPING MACHINE.

1,107,474.  Specification of Letters Patent.  Patented Aug. 18, 1914.

Application filed October 28, 1912. Serial No. 728,206.

*To all whom it may concern:*

Be it known that I, GEORGE SAMUEL BAKER, of the firm of Joseph Baker & Sons, Limited, a subject of the King of England, residing at London, in England, have invented certain new and useful Improvements in Biscuit-Wrapping Machines, of which the following is a specification.

This invention relates to improvements in machines for wrapping biscuits and the like.

The biscuits are fed by a slide which carries them with a sheet of wrapping paper along a table over a box or chamber, where they are gripped by end holders or pressers which hold them in compact formation and carry same into said box with the paper which incloses the biscuits on certain sides. The end holders retain the biscuits in said box compactly together until certain folds have been given to the paper by appropriate devices sufficient to prevent the biscuits getting out of place whereupon the packet thus far produced is moved further between spring pressed guides to complete the folding, and thence to a labeling device by which a label is attached to each end of the packet. After this operation the labeled packet is forwarded and discharged from the machine, being however held between endless traveling belts for sufficient time to enable the gummed labels to adhere or become dry.

A practical embodiment of the machine is shown in the annexed drawings in which—

Figure 1 is a side elevation and Fig. 2 a plan showing the general arrangement of the machine, many of the parts being omitted for the sake of clearness of illustration.
Figs. 1ª and 1ᵇ are detail views of suction devices hereinafter described which act on the paper during feed thereof.
Fig. 7 is a detail side elevation showing the paper feeding slide and Fig. 8 is a partial plan view thereof.
Fig. 13 is a perspective view showing the first of the wrapping operation.
Figs. 14, 15 and 16 are diagrammatic detail views illustrating various stages in the operation of forming the top fold of the packet.
Fig. 18 is an end view of a completed packet with label attached.
Figs. 21 and 22 are sections on the lines XXI— XXI and XXII—XXII of Figs. 19 and 20 respectively.
Fig. 23 is a detail side elevation of a paper pressing or holding device hereinafter referred to.
Fig. 24 is a partial plan view of same.
Fig. 25 is a detail view of a device used in connection with the apparatus of Figs. 23 and 24.
Fig. 30 is a partial end elevation showing operative cross heads and devices for holding and pressing the biscuits or packet previous to and during the wrapping operation.
Figs. 31 to 35 are detail views of parts in connection with said cross heads.
Fig. 36 is a sectional detail view of a fold pressing finger.
Fig. 37 is a detail plan view showing means for actuating said finger.

Figure 3:
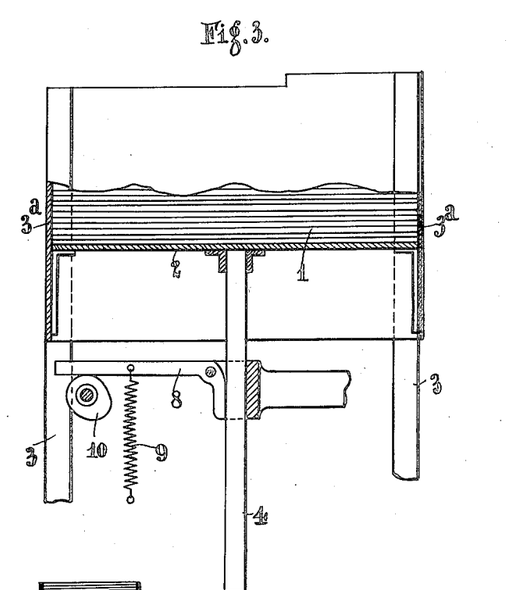
Fig. 3 is a sectional detail view of the paper feed table and means for holding and releasing same.
Figure 4:
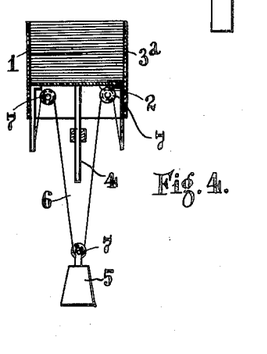
Fig. 4 is a similar detail view on a smaller scale showing the means for counterweighting the table.

I will first describe the main wrapping machine. Presuming that the desired quantity of biscuits has been placed on the holder of the main feed slide, the sheets of paper 1 are placed on a table 2 (Figs. 3 and 4) mounted for vertical movement between angle iron guides 3 in a box 3ª. The table is provided with a central supporting pillar 4 and is moved upward by a weight 5 connected by a cord 6 passing about pulleys 7. During feeding of the sheets by the feed slide hereinafter described the table 2 is held stationary by means of an angular arm 8 under the action of a spring 9 tending to press said arm against the pillar 4 but when a fresh sheet of paper is to be brought into position for feeding, the pressure of said arm is relieved by means of a cam 10 acting thereon, this cam being mounted on a shaft 10<sup>a</sup> and timed to operate at the proper moment, thus bringing the table again under the action of the weight 5. When the uppermost sheet of paper 1 has been brought into position for feeding it is acted on at its rear edge by a perforated plate 11 (Fig. 1<sup>a</sup>) forming the base of a suction box 12 which is hinged to the feed slide hereinafter described and the interior of said box is in communication with a tube 13 connected by flexible piping 14 to another stationary pipe 15 in communication with the interior of a valve box 16 connected by valved pipes 17 with a suction pump or the like (not shown). The plate 11 is pressed down on to the paper at the correct time by means of a lever 18 mounted on shaft 19 (Fig. 1<sup>b</sup>) which is rocked by lever 20 and rod 21 connected at its opposite end to a spring pulled bell crank 22 acted on by a cam 23 mounted on a shaft 24, the valve in the valve box 16 being also actuated to produce suction in the box 12 by means of another cam 25 also on shaft 24 acting on a spring pulled lever 26 connected to valve spindle 27. By this means the uppermost sheet of paper is caused to be carried along with carriage 28 during the forward movement thereof.

Figure 7:
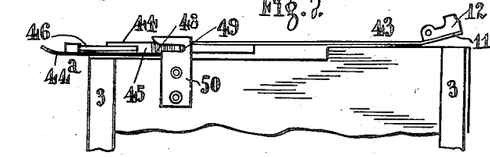
Figure 8:
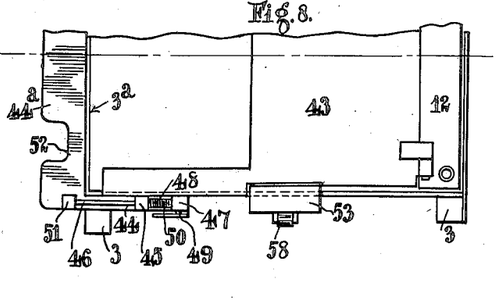

The carriage 28 is mounted to run in lateral guides 29 on the machine frame and is provided with an abutment 30 which on rearward movement of the carriage engages a resilient buffer 31 carried by a cross bar 32 mounted on the frame. The reciprocating movements of the carriage may be produced by any convenient means, those shown in the drawings including a link 36 connected to the carriage, a curved lever 37 pivoted on a shaft 38 on which are mounted two diverging arms 39 actuated by a double acting cam 40 on a transverse shaft 41. The said carriage 28 is provided at its forward end with spring clips 33 which receive between them the biscuits to be forwarded to the wrapping position, said biscuits resting on a base plate 35. The carriage also carries the paper feed slide 42 (see more particularly Figs. 7 and 8) which comprises a rear member 43 against the under surface of which the top sheet of paper is sucked by means of the plate 11 as above described and a forward member 44 adapted to have movement relatively to said rear member to enable the forward end of the sheet to be supported by and above said forward member. The connection between the two members is so made that the rear member moves first to bring the forward part of the sheet on to the forward member of the slide and then permits the two members to move forward together to carry the sheet into the position in which the wrapping is effected. This is accomplished by providing on rear member 43 a lug 45 adapted to slide on a rod 46 connected to the front member 44, the latter also carrying a second lug 47 between which and the lug 45 is a spring 48. On rearward movement of the slide a pin 49 projecting from the lug 47 engages a hook 50 attached to the paper box 3<sup>a</sup>, thus causing the spring 48 to be compressed and toward the termination of said rearward movement causing both slide members to move together into the normal position shown in Figs. 7 and 8. During the first part of the forward slide movement the leg 45 slides on the rod 46 and allows movement of the rear member without affecting the forward member until said lug 45 engages another lug 51 on the forward member whereupon the two members move together. This primary movement of the rear member causes the front edge of the paper sheet to be brought on to the forward bar 44<sup>a</sup> of the front member, the two slide members moving together as described to carry the paper to the wrapping position. It will be understood that the mechanism just described is provided on both sides of the slide, Fig. 8 showing in plan only one half thereof. The bar 44<sup>a</sup> of the front slide member is recessed as at 52 for the purpose of clearing certain fold holding fingers hereinafter referred to.

Figure 5:
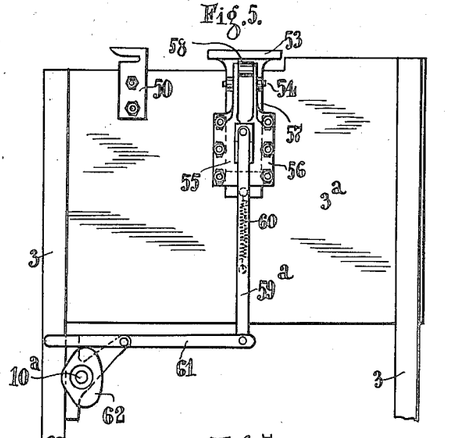
Fig. 5 is a detail side elevation of the paper container showing also means for gripping and releasing the uppermost sheet.
Figure 6:
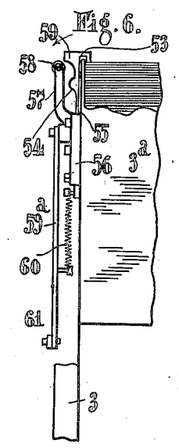
Fig. 6 is a fragmentary end elevation of Fig. 5.

During the rearward movement of the carriage 28 and slide 42, it is necessary to slightly depress and grip the stack of paper 1 in order to prevent the upper sheet being drawn off by the slide and to this end there is provided, one at each side of the box 3<sup>a</sup>, a device shown in Figs. 5 and 6, comprising a gripper 53 spring hinged at 54 to a slide 55 mounted in a guide bracket 56 on the side of the paper box 3<sup>a</sup>. The gripper is shaped to extend over the upper edge of the box and engage the surface of the top sheet and the spring hinge tends to normally hold the gripper out of action, but the same is brought into action at the proper time (and when the table 2 has been released from the gripping arm 8) by means of an arm 57 having a roller 58 which engages a curved surface 59 of the gripper. Said arm and roller are stationary and secured to the bracket 56 and the gripper is adapted to be given vertical movements in said bracket by means of a rod 59<sup>a</sup> secured to the slide 55 by a spring 60 and a lever 61 operated by a cam 62 mounted on the aforesaid shaft 10<sup>a</sup>. After the rear edge of the top sheet of paper has been raised to the suction plate 11, a third clip (not shown) similar to 53 and working alternately with same, comes into operation to press upon the rear upper surface of the second sheet to prevent this and the sheets below from being removed with the top sheet by the movement of the slide.

Figure 9:
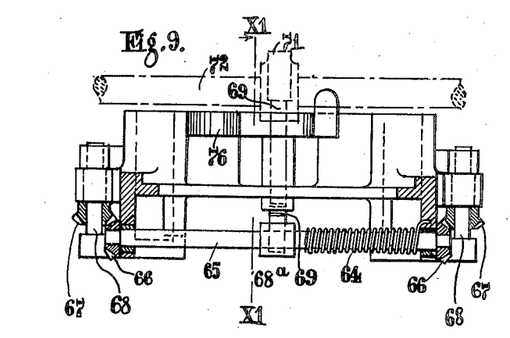
Fig. 9 is a sectional detail end elevation showing means for gripping and releasing the biscuits during the feed thereof.
Figure 10:
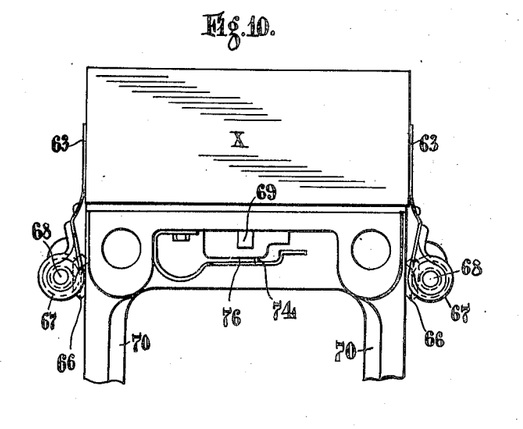
Fig. 10 is a plan view of Fig. 9, and Fig. 11 a section on the line XI—XI of Fig. 9.
Figure 11:
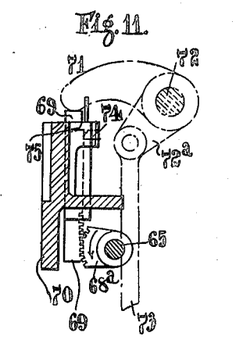
Figure 12:
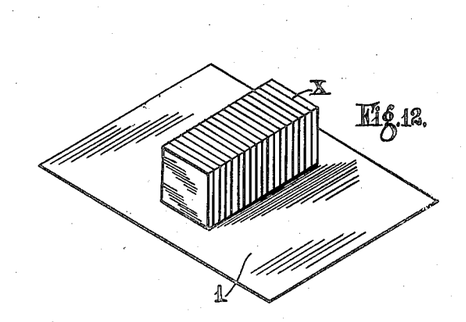
Fig. 12 is a perspective view showing the position of a stack of biscuits and sheet of paper previous to the wrapping operation.

Figs. 9 to 11 show a further embodiment of the biscuit gripping means. In this construction also two spring clips 63 adapted to grip the ends of the biscuits $x$ (Fig. 10) are employed mounted in a frame 70 forming part of the carriage 28, the resilient action of said clips being produced by a torsion spring 64 coiled about a shaft 65 provided at each end with a bevel wheel 66 which meshes with another bevel wheel 67 mounted on a spindle 68 each carrying one of the clips. On shaft 65 is a toothed quadrant $68^a$ meshing with a rack 69 mounted in frame 70. When the clips 63 are in the gripping position shown in Fig. 10 the rack 69 projects above the frame as in Fig. 11 and in order to release the biscuits from the clips when they arrive in wrapping position, the projecting end of the rack is depressed by a finger 71 mounted on a shaft 72 extending across the machine and rocked by means of a lever $72^a$ and rod 73 operated in any convenient manner, this action opening the clips through the quadrant $68^a$, shaft 65, gears 66, 67 and spindles 68. The rack is held in its depressed position by a spring bolt 74 engaging a notch 75 in the rack so that during return of the carriage to normal position the clips remain open for reception of another batch of biscuits. When said batch has been inserted the operative releases the bolt 74 by means of a spring finger piece 76 connected thereto, thus causing the clips to grip the ends of the new batch of biscuits. When the biscuits and paper have been fed by the forward movement of the carriage 28 and slide 42 to the wrapping position below the cross heads 77 and 78 marked in Fig. 1, the biscuits are gripped by the end holders 99 and 100 hereinafter described, which are moved toward the center and act to keep the biscuits in compact formation while the clips are released and the feed slide and carriage return to their original positions, as above mentioned.

Figures 21, 22, 23, 24, 25:
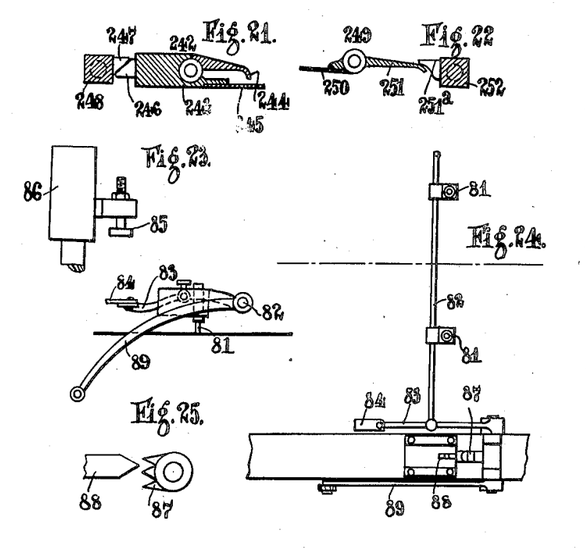

The paper is prevented from being fed too far forward and is properly positioned by engaging stops 79 on a bar 80 extending across the machine and in order to prevent the paper being drawn back during the rearward movement of the feed slide 42 the front edge thereof is gripped for example in two places one at each side by a finger 81 more particularly shown in Figs. 23 and 24. These fingers are supported by a transverse rod 82 at each end of which is a lever 83 having a plate 84 which is depressed by an abutment 85 on a cross head 86 (hereinafter fully described) to bring the fingers down upon the forward edge of the paper. The fingers are locked in this position by means of a double-toothed catch 87 (Fig. 25) mounted on the pivot of lever 83 and engaged by a spring bolt 88 which holds the lever either in raised or lowered position. Also mounted on the pivot of lever 83 is an arm 89 in a plane outside the machine frame which is acted on to release the fingers from the paper by a curved block 90 on a lever 91 (Fig. 1) the purpose of which will be explained below.

The end holders 99, 100, are so operated that when or before the biscuits are released from the clips they are moved toward the center of the machine into the position shown in Fig. 30 and abut against the end biscuits of the stack so that the biscuits are held in correct position over a box or chamber $98^a$, whereupon the holders move downward with the biscuits and paper into said chamber which is formed in a slide 93 (Figs. 26 and 27) adapted to reciprocate to and fro in a plane below that of the feed slide 42. The slide 93 comprises a base plate 94 having a sliding false bottom 95 and the space or chamber $98^a$ to be occupied by the biscuits is bounded at the rear by a plate 96 and at the front by a series of spring pressed tongues or sections 97.

The means for operating the end holders 99 and 100 is as follows:—Carried by the cross head 77 before mentioned are pairs of tubes 98 (Figs. 30 and 35) to the lower ends of which are rigidly secured the lower holders 99 and slidably mounted on said tubes and under the action of springs within same are the upper holders 100 the springs tending to normally keep said holders raised as in Fig. 30. Each opposite pair of tubes is mounted in a separate rack bar 101, 102, (Figs. 32 to 34) having teeth 103 at different levels as shown more particularly in Fig. 34 and adapted to be engaged by a pinion 104 mounted on a vertical spindle 105 driven by bevel wheel 106 and segment 107 on a shaft 108 in such a manner as to cause the rack bars to move toward or away from the center of the machine in opposite directions so that the holders are moved toward or away from the biscuits. The spindle 105 is provided with a feather 109 so that the cross head 77 can have vertical movement without interfering with the operation of the bevel wheel 106 and the shaft 108 is rocked by means of a quadrant $109^a$ (Fig. 1) meshing with a rack 110 operated in one direction by a rod 112 acted on by a cam (not shown) on the shaft 24 previously mentioned, and in the other direction by a spring 114. Fig. 33 shows clearly the manner of mounting the rack bars 101, 102, in the cross head 77, the side bars 115 of the latter being hollow for reception of the racks which have flanges 116 guided in said side bars. The cross head 77 also supports a presser plate 92 which is caused to press upon the biscuits and aline the upper edges thereof while they are held by the end holders 99, 100 as explained. The plate 92 is carried by tubes 230 mounted in cross frames 231 straddling the side bars 115 of the upper cross head so that parts 232 thereof lie in the path of the side bars 233 of the lower cross head 78 for a purpose hereinafter explained. The plate 92 is loosely carried by the tubes 230 and is under the action of buffer springs contained within casings 234 tending to hold the plate normally in its lower position and allowing the pressure thereof on the biscuits to be resilient. The cross heads 77 and 78 may be operated by any suitable mechanism but in Figs. 1 and 2 there are shown for this purpose, rods 235 and 236 respectively one rod of each at either side of the machine, said rods being connected to levers 237, 238 mounted on a shaft 239 which is oscillated at the desired times to produce the falling and rising movements of the cross heads for example by cams (not shown) located between the side frames of the machine in a manner which will be clearly understood. The cross heads are guided in their movements by rods 240 connected above by a transverse beam 241.

Figures 13, 14, 15, 18:
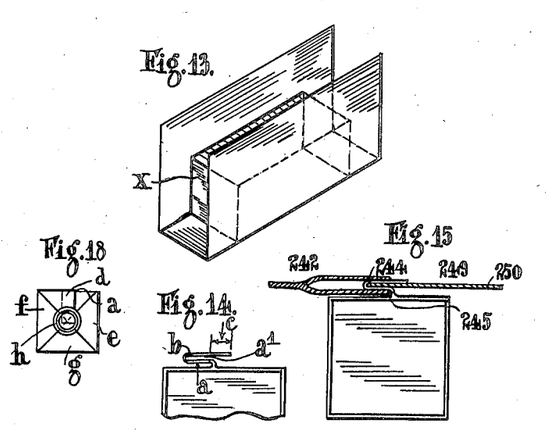
Figure 16:
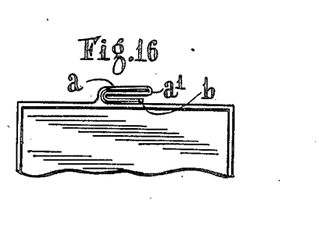

The paper and biscuits having been brought into the chamber 98$^a$ as described the latter causes them to assume the relative positions shown in Fig. 13 and the next operation to be performed is the folding of the paper over the top surface of the biscuits referred to as "top folding." Figs. 14, 15 and 16 show diagrammatically stages of the folding operation and Figs. 19 to 22 show the top folding mechanism.

Figures 1, 1A, 1B:
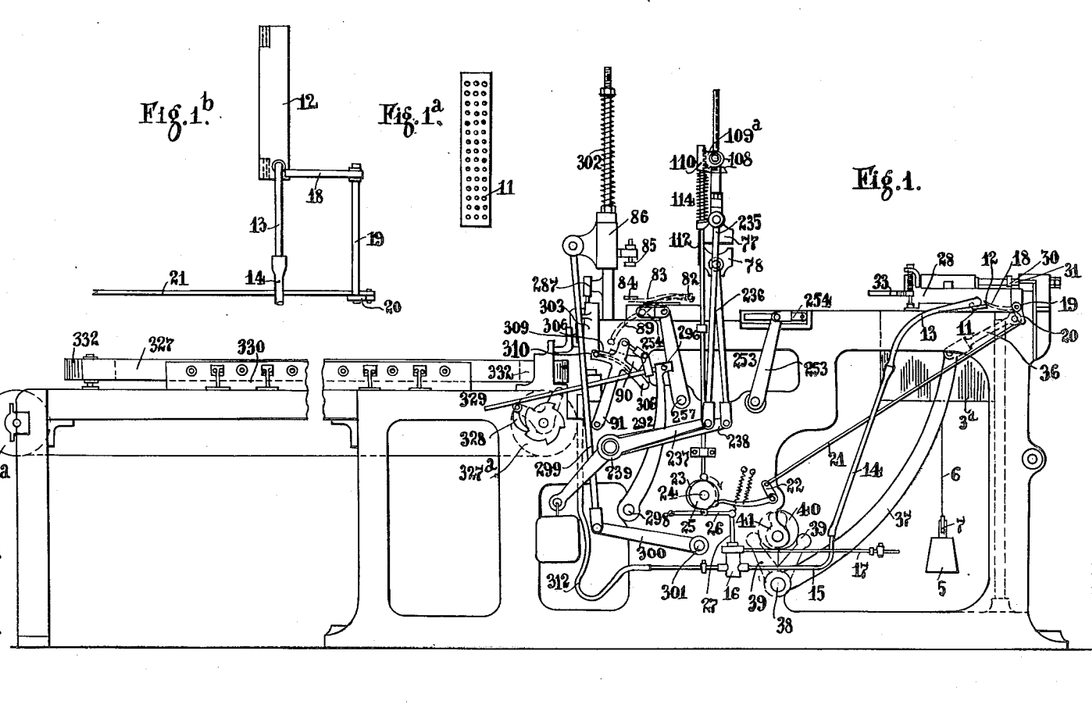
Figure 2:
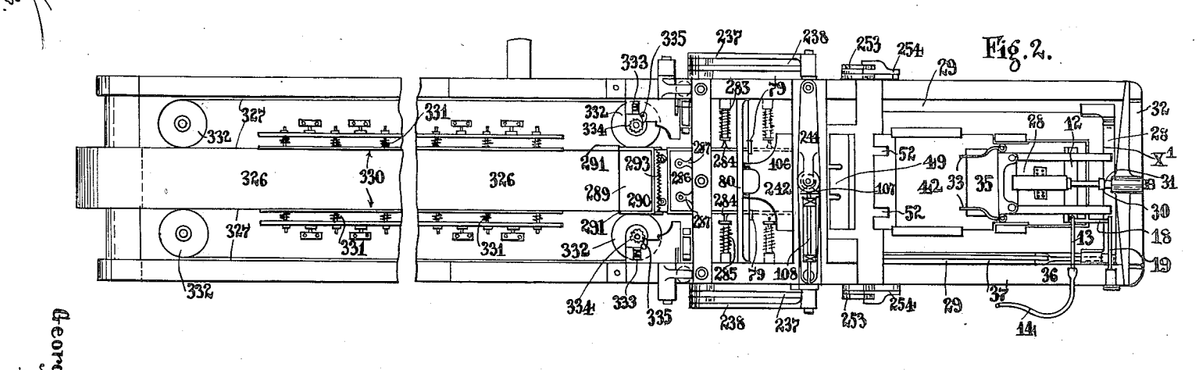
Figures 19, 20:
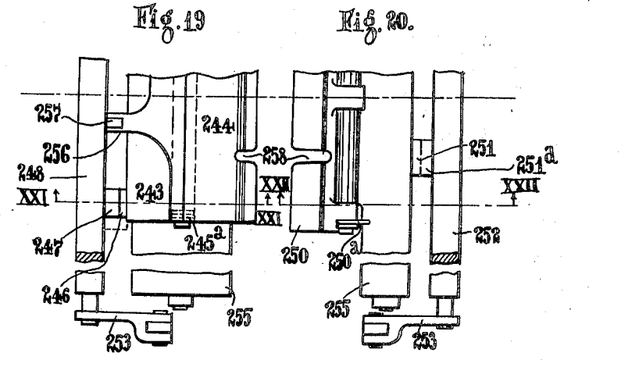
Figs. 19 and 20 are partial plan views of the top folding devices.

As shown in Figs. 19 and 21 the left hand folder 242 comprises a plate 243 to which is pivoted an upper blade or jaw 244 and having fixed thereto a lower blade or jaw 245, the upper jaw being under the action of a spring 245$^a$ tending to normally keep the jaws open. At the rear of the plate is an inclined abutment 246 adapted to be engaged by a similar abutment 247 on a transverse bar 248. Figs. 20 and 22 show the right hand folder 249 which comprises a single pivoted blade or jaw 250 under the action of a spring 250$^a$ tending to hold it downward and having a tail piece 251 which is acted on by a curved abutment 251$^a$ on a transverse bar 252. The folders and bars are suitably guided at their ends in the machine frame for reciprocating movement therein and are given these movements at the desired times by any suitable mechanism, Fig. 1 showing levers 253 connected by links 254 pivoted to the ends of the bars 248, 252 and other levers (not shown) immediately behind the levers 253 connected to the jaws by means of supporting members 255. The levers are operated by appropriate means such as cams between the side frames in a manner which will be readily understood.

Referring now also to Figs. 14 to 16, the folders 242 and 249 move toward the right and left respectively into the position shown in Figs. 14 and 15 thus making the first folds $a$ $a^1$, the blade 250 being then withdrawn and slightly tilted by its tail 251 coacting with the abutment 251$^a$ so that it will ride over the portion $b$ of the fold, when again moving toward the left at which time it presses down the portion of the fold marked $c$. The blades 244 and 245 are now caused to close by the coaction of a tail piece 256 on blade 244 coacting with an abutment 257 on the bar 248 and move farther to the right, the blade 245 being lifted by means of the coacting abutments 246, 247 and turning the fold member $a$ $a^1$ completely over the rest of the fold into the position shown in Fig. 16 the jaws being opened and the blade 250 at the same time withdrawn toward the right. The blades are provided in their adjacent edges with recesses 258 to clear fold holding fingers hereinafter fully described.

During production of the top fold as just described the presser plate 92 has been slightly raised to allow movements of the folders. This is accomplished by the lower cross head 78 rising and the side bars 233 thereof engaging under the portions 232 of the cross frames 231 thus lifting the tubes 230 mounted in said cross frames and consequently the presser plate. Immediately the top fold is completed the same is acted on by holding fingers 260 (see particularly Figs. 30 and 36) each of which is slidably mounted in a tube 230 and capable of passing through the presser plate 92 into the position shown in broken lines in Fig. 30. The finger 260 is under the action of a spring 261 normally tending to force the finger downward into such position but prevented from doing so by a tappet 262 on the finger engaged by a spring bolt 263. The rod is released to allow the spring to bring it into operative position by the following means (see Figs. 30 and 37). The bolt is provided with a bell crank lever 264 one arm of which is connected to the bolt and the other arm lies in the path of a stop 265 on the bearing 266 of the spindle 105. As the lower cross-head 78 rises as above described the bell crank lever 264 engages the stop 265 thus withdrawing the bolt 263 and permitting the spring 261 to bring the finger into the dotted line position of Fig. 30. To again raise the finger to normal position illustrated in Fig. 36, the tappet 262 is connected by a link 267 to a double armed lever 268 carrying an antifriction roller 269 and mounted in a bracket 270 extending from a cross frame 231. On a subsequent upward movement of the cross head 77, the roller 269 engages an abutment 271 depending from the cross beam 241 and thus lifts the finger, the downward movement of which is again arrested by the spring bolt 263 engaging under the tappet 262. It will be seen from Fig. 30 that there are two fingers 260, the above description serving for both.

Figure 17:
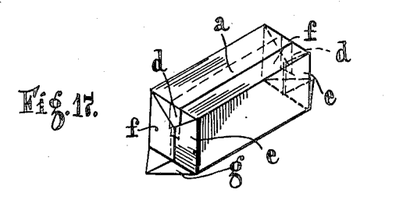
Fig. 17 is a perspective view of a packet completed with the exception of the bottom end folds.
Figure 26:
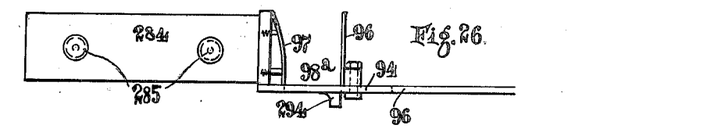
Figs. 26 and 27 are respectively a side elevation and plan view of a lower slide or carriage in which the packet is placed during the greater part of the folding or wrapping operations and showing also guides through which the packet passes to produce the forward end folds.
Figure 27:
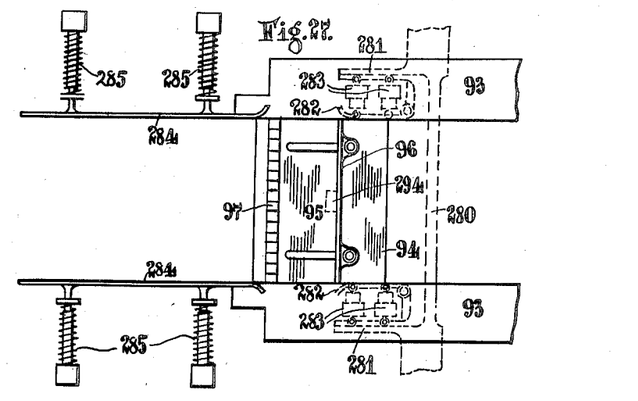
Figure 28:
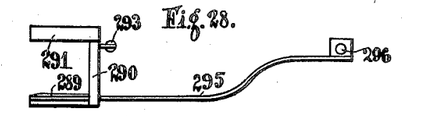
Figs. 28 and 29 are respectively a side elevation and plan view of a delivery slide for the folded or wrapped packet.
Figure 29:
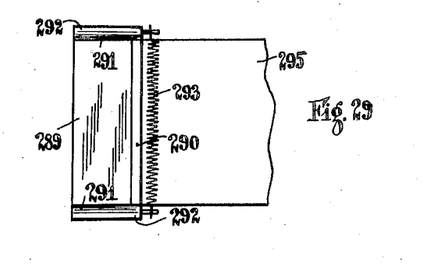
Figures 30, 31, 32, 33, 34, 35, 36, 37:
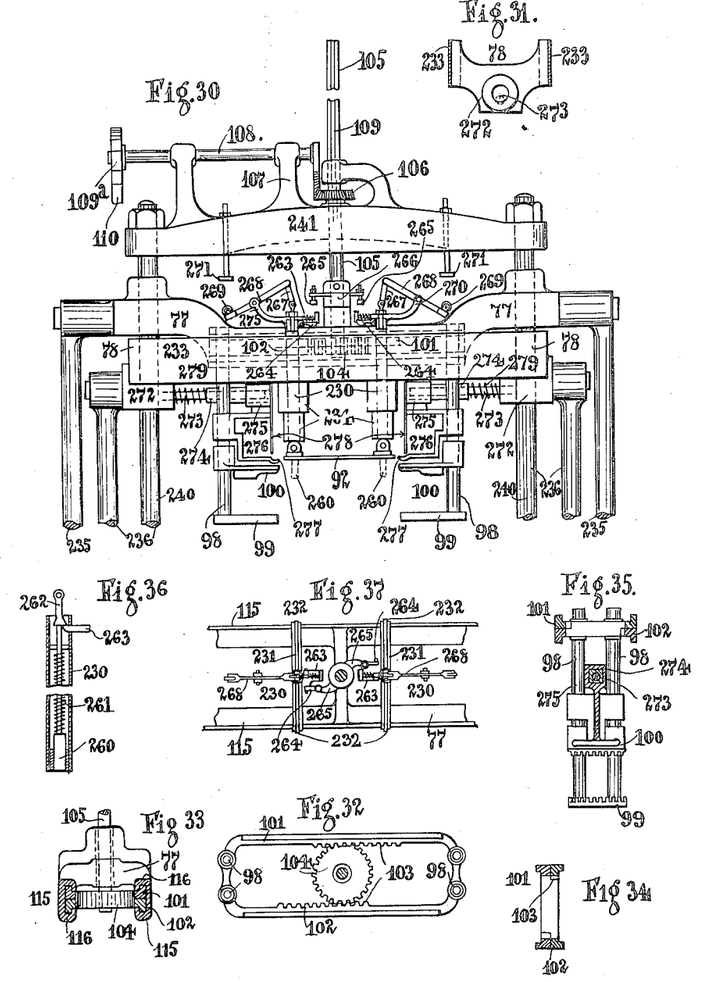
Figures 38, 41, 42, 43:
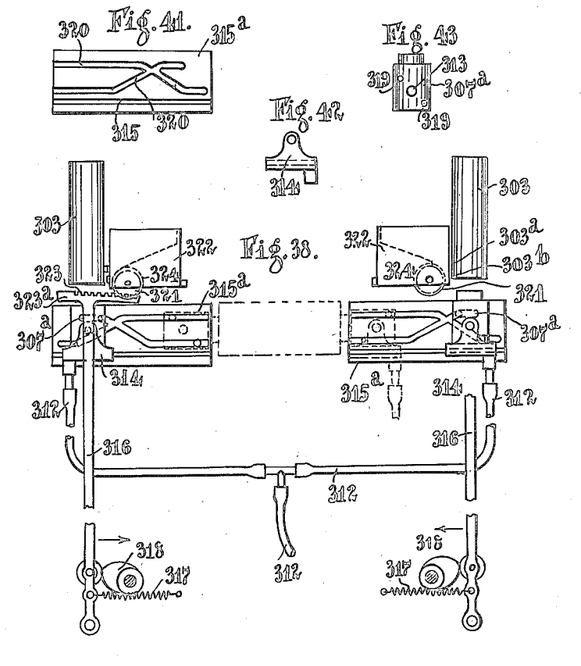
Fig. 38 is a diagrammatic elevation showing mechanism for attaching a label to each end of the packet.
Figs. 39 to 45 are detail views of parts shown in Fig. 38.
Figure 39:
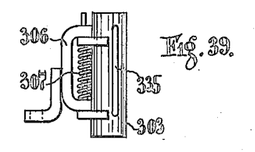
Figure 40:
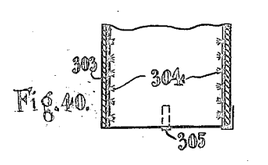
Figure 44:
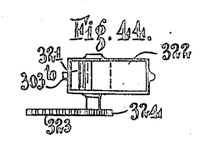

The next operation to be performed is the production of the top end folds of the packet marked $d$ in Fig. 17 and this is effected by the following means (see Figs. 30, 31 and 35). The lower cross head 78 in addition to having the side plates 233 above referred to, is provided with end members 272 the latter being at a lower level than said side plates. Screwed into each end member is a rod 273 carrying two telescoped sleeves 274 and 275 respectively. The outer of said sleeves 274 carries a folder block 276 slidably mounted on rod 98 before mentioned and having an inwardly projecting finger 277 adapted to engage the end of the packet. The inner sleeve 275 carries a thin plate 278 under the action of a spring 279 tending to force same inward but normally held from such inward movement by any convenient form of spring catch (not shown). In operation of these parts, on downward movement of the cross head 78 the block 276 and plate 278 are moved downward with the finger 277 in contact with the paper thus forming a preliminary top end fold, this movement of the block forcing the upper end holder 100 down upon the lower holder 99 against the action of its spring. The block 276 being guided on rod 98 is now moved away from the center of the machine by the action of the rack bars 102, 103 previously mentioned and in so doing releases the spring catch and permits the plate 278 to press firmly against the end fold to compact and finish the same. The plates 278 remain in this position during the production of the back end folds (marked $e$ in Fig. 17) which is the next wrapping operation to be performed and which is carried out as follows, reference being directed to Fig. 27. This figure shows in broken lines a transverse frame 280 which is capable of being reciprocated horizontally at the required times by any convenient means (not shown). This frame has two forwardly extending arms 281 one at each side and carried by these arms are pivoted blades 282 having curved forward ends and forming the folders which blades are under the action of springs contained within casings 283 connected at opposite ends to the arms and blades. It will be obvious that as the frame 280 moves forward that is, to the left in Fig. 27, the blades 282 will resiliently engage the ends of the packet and act on the paper to produce the back end folds $e$, the stroke of the frame 280 being controlled to prevent the blades reaching the paper which will subsequently form the front end fold. After production of folds $e$ as described, the plates 278 are raised together with block 276 by the upward movement of cross head 78 and the packet is now ready for production of the front end folds marked $f$ in Fig. 17 which are simply produced by forwarding the packet in the chamber 98$^a$ between lateral plates 284 having curved forward ends pressed by springs 285 toward the center line of the machine as shown in Figs. 26 and 27. The packet is now in the condition illustrated in Fig. 17 and the only remaining fold to be dealt with is the bottom end fold $g$, this being also simply closed by moving the packet downward into a delivery slide illustrated in Figs. 28 and 29 located below the slide 93 and comprising a base 289 at the forward end of which is a cage consisting of a back member 290 and two open ends formed by hinged members 291 having curved surfaces 292 to permit of easy insertion of the packet, said members 291 being under the action of a spring 293 to produce resilient pressure on the ends of the packet. The downward movement of said packet is produced by means of a presser plate 286 (Fig. 2) carried by lugs 287 extending from the cross-head 86 before referred to and in order that the packet shall have access to said delivery slide it is necessary that the false bottom 95 of the chamber 98$^a$ in which the packet has been held up to now shall be moved backward, that is, to the right in Fig. 26, and to effect this the said bottom is provided with a lug 294 which as the slide 93 moves forward engages a suitable abutment in its path, the bottom being again returned to normal position by said lug engaging another abutment on the return movement in a manner which will be readily understood.

The delivery slide is connected as by plate 295 and rod 296 to a lever 297 outside the machine frame, said lever being mounted on a shaft 298 rocked at the required times as by a cam located between the side frames of the machine. The cross head 86 is shown as operated in an upward direction by means of a rod 299 and lever 300 one at each side of the machine, the levers being on a cam operated shaft 301, and in a downward direction by a spring 302.

Figure 45:
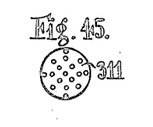

While the packet is in the delivery slide a label is attached to each end thereof over the end folds as shown at $h$ in Fig. 18, this being effected as follows with reference to Figs. 38 to 45 of the drawings. The labels are stored in cylinders 303 at each side of the machine, the cylinders being provided interiorly with very fine brushes 304 to retard any undue action of the suction withdrawing means described below. At the bottom of the label cylinders are a number of small protecting lips 305 which engage the lowermost label and arrest those above when the bottom one has been removed by suction. The cylinders are mounted at the sides of the machine in brackets 306 (Fig. 39) under the action of springs 307 which normally keep them raised, but which will permit of their being depressed on to suction blocks 307ª by means of an eccentric quadrant 308 (Fig. 1) mounted outside the machine frame on lever 91 and having a groove 309 which engages a stud 310 on the cylinder. The suction blocks have perforated tops 311 as shown in Fig. 45 so that when suction is exerted through the blocks by means of flexible piping 312 connecting the suction boxes to the valve box 16 before referred to a label will be removed from each cylinder 303. The cylinders now rise again leaving the label on the suction box. The suction boxes are mounted by means of trunnions 313 on slides 314 to which the flexible pipes 312 are connected. The slides run in guide slots 315 in cam plates 315ª and are moved toward the center of the machine by means of rods 316 pivoted at the bottom of the machine, normally held toward the machine center by springs 317, and pressed apart away from the center by means of cams 318, operated at the required times by any convenient means. The said rods are connected to the sides 314 and the suction boxes are carried by said slides and have friction rollers 319 which engage cross cam paths 320 in the plates 315ª. The rollers on the boxes engage the cam paths in such a manner that as the slides are moved toward the center of the machine they are tilted through an angle of 90° as shown in broken lines in Fig. 38. This brings the label, still held on the suction block, on to the end of the packet lying between the blocks, and during this forward movement and before the tilting of the suction block takes place, the label on the end of the block is caused to travel under a gumming roller 321 mounted in a trough 322 and receives a coating of adhesive by which it can be stuck on the end of the packet. To produce rotation of the gumming rollers the rods 316 terminate at their upper end in quadrants 323 which engage pinions 324 on the axles of the gumming rollers, so that these are rotated at each action of the labeling device. On return of the suction blocks, the gumming box is lifted to clear the suction box by means of a small cam path 323ª at end of rack and is retained in this position by means of a double spring catch (not shown) until the suction box has passed it. The gumming box is returned to its gumming position by the downward motion of the label cylinder 303, this being brought about by a small projection 303ª on the side of cylinder 303 engaging with a similar projection 303ᵇ on the gumming box. At or about the time the tilting position is reached the suction on the boxes is automatically removed, this being produced by proper operation of the valve in the valve box 16. The cylinders 303 may be provided with inspection slots 325 for viewing the labels therein to determine when the cylinders require recharging. After the labeling and gumming operations the packet of biscuits is discharged by forward movement of the delivery slide on to a horizontal endless web 326 and at the same time between lateral endless webs 327 which hold the labels in position until they have adhered sufficiently to the ends of the packets. The web 326 is mounted on rollers 327ª and is operated by pawl and ratchet mechanism 328 driven by rod 329 from lever 297 before mentioned. The lateral webs 327 are pressed toward the center of the machine by boards 330 under the action of springs 331 so as to press the labels firmly on the ends of the packet. The rearward pulleys 332 carrying the webs 327 are pressed toward each other by springs 333 and the axles of these pulleys are provided with ratchets 334 with which engage retaining pawls 335 to prevent back movement of the webs. The packet is now completed and may be removed from the web 326 by hand or otherwise.

I wish it to be understood that I do not confine myself to the various arrangements of cams, levers, rods and the like described and illustrated for operating the various parts or mechanisms as equivalents thereof or other suitable means may be used for these purposes.

What I claim as my invention and desire to secure by Letters Patent of the United States is:—

1. In a wrapping machine, the combination of a pair of reciprocating cross heads operating upon a stack of articles and a wrapper therefor, a resiliently mounted plate mounted on one of said cross-heads and adapted to press upon the upper edges of a stack of articles, holders adapted to grip the ends of the articles also carried by said cross-head, double rack and pinion mechanism carried by said cross-head adapted to move said holders to and from the articles, and means carried by the other of said cross-heads for producing the top end folds of the wrapper.

2. In a wrapping machine, the combination of two pivoted devices adapted to produce the upper folds of a wrapper inclosing the articles, one of said devices comprising two relatively movable spring pressed jaws, and the other comprising a spring pressed plate, means for reciprocating said devices toward and away from each other, means for rocking said devices about their pivots, and means for closing and opening the jaws of said first-mentioned device.

3. In a wrapping machine, the combination with a reciprocating cross-head, of spring actuated fingers carried thereby adapted to press the upper folds of a wrapper inclosing the articles, means operated by the movements of said cross-head for retaining said fingers in inoperative position, and for releasing said fingers from said retaining means.

4. In a wrapping machine, the combination with a sliding member adapted to receive a stack of articles and a wrapper therefor, of means for forming the back end folds of said wrapper, comprising a horizontally reciprocating frame, adjustable resiliently mounted members carried by said frame and adapted to engage the rear end portions of the wrapper while the articles and wrapper are stationary, and stationary resiliently mounted plates between which the articles and wrapper are fed horizontally by movement of said sliding member, said plates acting on the forward ends of the wrapper to produce the front end folds thereof.

5. In a wrapping machine, the combination of means for holding a stack of articles and a wrapper therefor, with horizontally reciprocatable and rocking members adapted to produce top folds of said wrapper, vertically reciprocatable members adapted to produce upper end folds of said wrapper, a horizontally reciprocating member adapted to produce rear end folds of said wrapper, resilient pressing members, means for moving the articles and wrapper horizontally between said latter members to produce forward end folds of said wrapper, a receptacle disposed below said folding means, and having resilient members adapted to engage the ends of the wrapper, and means for moving the articles and wrapper vertically between said resilient members to produce the lower end folds of said wrapper.

6. In a wrapping machine, feeding mechanism comprising in combination a reciprocating carriage, spring clips carried thereby to receive a stack of articles between them, a bipartite wrapper feeding slide carried by said carriage, and means for producing feeding movement of one member of said slide alone, and subsequent movement of the two members simultaneously to feed the wrapper.

7. In a wrapping machine, the combination of a reciprocating feed carriage, spring clips carried thereby to receive a stack of articles between them, spindles on which said clips are mounted, a spring actuated shaft geared to said spindles, rack and segment gearing coacting with said shaft, and a tappet engaged by said rack whereby the clips are actuated to release the articles.

8. In a wrapping machine, the combination of a reciprocating carriage adapted to feed the articles, a wrapper feed slide carried by said carriage, means for releasing the articles from said carriage, means for engaging the articles and carrying same together with the wrapper to a different level, means acting on the wrapper to produce top folds, upper end folds and rear end folds, means for moving the wrapper and articles horizontally to produce front end folds, means for moving the wrapper and articles to a still different level to produce bottom end folds, and means for discharging the completed packet.

9. In a wrapping machine, feeding mechanism comprising in combination a reciprocating carriage, spring clips carried thereby to receive a stack of articles between them, a bi-partite wrapper feeding slide carried by said carriage, means for producing feeding movement of one member of said slide alone and subsequent movement of the two members simultaneously to feed the wrapper and means for automatically opening the clips to release the articles.

10. In a wrapping machine, the combination of a pair of holders adapted to grip the ends of a stack of loose articles partly inclosed in a wrapper, a pair of reciprocatable and rockable members adapted for movement above the articles to make upper folds in the wrapper, vertically movable members adapted to engage the wrapper at each side of the articles to produce top end folds, horizontally movable members adapted to engage the wrapper from the rear at each side to form rear end folds, stationary lateral members, means for moving the articles and wrapper horizontally between said lateral members to form front end folds, a device at a lower plane than said moving means having end abutments, and means for depressing the articles and wrapper past said abutments to produce the lower end folds.

11. In a wrapping machine, means for feeding a quantity of loose articles and a wrapper simultaneously with the wrapper positioned below the articles, means for moving the articles and wrapper vertically downward and simultaneously partially inclosing the articles in the wrapper, horizontally movable devices adapted to produce top folds in the wrapper, vertically movable devices adapted to produce top end folds in the wrapper, horizontally movable devices adapted to produce rear end folds in said wrapper, means for moving the articles and wrapper horizontally and simultaneously producing front end folds in the wrapper, and means for again moving the articles and wrapper vertically downward and simultaneously producing lower end folds in said wrapper.

12. In a wrapping machine, the combination of a reciprocating member having a chamber for reception of a quantity of articles and a wrapper therefor, a sliding bottom to said member adapted to be displaced by reciprocating movements thereof, a reciprocating delivery slide disposed below the reciprocating member aforesaid, means for forcing the articles and wrapper downward from the member into said delivery slide when said sliding bottom is withdrawn, and means on said delivery slide for forming lower end folds on the wrapper during its downward movement.

13. In a wrapping machine, the combination of vertically and horizontally movable rods, holders mounted thereon adapted to grip the ends of a stack of loose articles, and carry them downward together with a wrapper, devices also mounted on said rods adapted to form a top end fold at each end of the wrapper, and simultaneously depress said holders, means for withdrawing the holders and folding devices from the ends of the articles and wrapper, and plates adapted for movement into position to retain said folds in the wrapper when the holders and folding devices are withdrawn.

In witness whereof I have signed this specification in the presence of two witnesses.

GEORGE SAMUEL BAKER.

Witnesses:
 H. D. JAMESON,
 C. P. LIDDON.